US012461313B2

United States Patent
Castillo-Garza

(10) Patent No.: US 12,461,313 B2
(45) Date of Patent: Nov. 4, 2025

(54) ROBUST PHOTONIC CONNECTOR

(71) Applicant: Raytheon Company, Waltham, MA (US)

(72) Inventor: Jose Rodrigo Castillo-Garza, West Hartford, CT (US)

(73) Assignee: Raytheon Company, Arlington, VA (US)

( * ) Notice: Subject to any disclaimer, the term of this patent is extended or adjusted under 35 U.S.C. 154(b) by 362 days.

(21) Appl. No.: 18/152,510

(22) Filed: Jan. 10, 2023

(65) Prior Publication Data

US 2024/0231001 A1 Jul. 11, 2024

(51) Int. Cl.
*G02B 6/30* (2006.01)

(52) U.S. Cl.
CPC .................................... *G02B 6/30* (2013.01)

(58) Field of Classification Search
CPC ........................................................ G02B 6/30
See application file for complete search history.

(56) References Cited

U.S. PATENT DOCUMENTS 4,725,728 A * 2/1988 Brininstool ........... G01L 11/025 250/227.14
5,891,022 A * 4/1999 Pologe ............... A61B 5/14552 600/326
6,594,419 B2 * 7/2003 Ukrainczyk ........... G02B 6/255 385/33
10,976,495 B2 4/2021 Cardenas et al.
2003/0031409 A1 * 2/2003 Bellman .............. G02B 6/3582 385/33
2004/0190840 A1 * 9/2004 Deutsch ........... H04B 10/25253 385/100
2005/0220403 A1 * 10/2005 Dykaar ................ G02B 6/4214 385/37
2010/0232745 A1 * 9/2010 Stacey ............... G02B 6/02314 385/99
2013/0322813 A1 12/2013 Grondin et al.
2015/0219853 A1 * 8/2015 Kumar ................... G02B 6/305 385/14
2017/0254959 A1 * 9/2017 Miao .................... G02B 6/3853

OTHER PUBLICATIONS

Nauriyal et al., "Fiber-to-chip fusion splicing for low-loss photonic packaging," Optica, vol. 6, No. 5, May 2019, 4 pages.

* cited by examiner

*Primary Examiner* — Michael P Mooney

(57) ABSTRACT

A system includes an optical communication device configured to transmit or receive optical signals. The optical communication device includes an optical fiber and a mode converter. The optical fiber and the mode converter are welded together by fusion welding a first end of the optical fiber to the mode converter. The optical communication device may also include an optical fiber holder configured to maintain an alignment of the optical fiber with respect to the mode converter. The optical fiber holder may include a V-groove configured to accommodate the optical fiber and a lid configured to secure the optical fiber on the optical fiber holder. The optical fiber holder may include a plurality of vias, and the optical fiber may be welded to the optical fiber holder at each of the plurality of vias.

20 Claims, 7 Drawing Sheets

MODE CONVERTER
208
CURRENT MODE
CONVERTER RESONANCE
220
APP MECHANICAL RESONANCES
230
FREQUENCY
(Hz)
CONVERTER LENGTH (MICRON)
$10^{10}$
$10^{8}$
$10^{6}$
$10^{4}$
$10^{2}$
$10^{0}$
$10^{1}$
$10^{3}$
$10^{5}$

ROBUST PHOTONIC CONNECTOR

TECHNICAL FIELD

This disclosure is generally directed to optical systems. More specifically, this disclosure is directed to a robust photonic connector.

BACKGROUND

Optical communication systems use light to transport data between locations or systems. Optical interconnects for photonic integrated circuits (PICs) transfer light to and from the PICs. The transfer efficiency of an optical interconnect determines the amount of light that is provided to a PIC and any subsequent subsystems using the light, so the transfer efficiency can have a direct impact on the operation and performance of the PIC and subsequent subsystems. Among other things, transfer efficiencies can affect the communication, processing, or sensing performance of applications using PICs. Harsh environments reduce transfer efficiencies, and current interconnects often cannot provide required transfer efficiencies for applications in these harsh environments.

SUMMARY

This disclosure is directed to a robust photonic connector.

In a first embodiment, an apparatus includes an optical fiber and a mode converter. The optical fiber and the mode converter are welded together by fusion welding a first end of the optical fiber to the mode converter.

In a second embodiment, a system includes an optical communication device configured to transmit or receive optical signals. The optical communication device includes an optical fiber and a mode converter. The optical fiber and the mode converter are welded together by fusion welding a first end of the optical fiber to the mode converter.

In a third embodiment, a method includes propagating light through an optical fiber. The method also includes using a mode converter to direct the light towards a photonic integrated circuit (PIC). The optical fiber and the mode converter are welded together by fusion welding a first end of the optical fiber to the mode converter.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
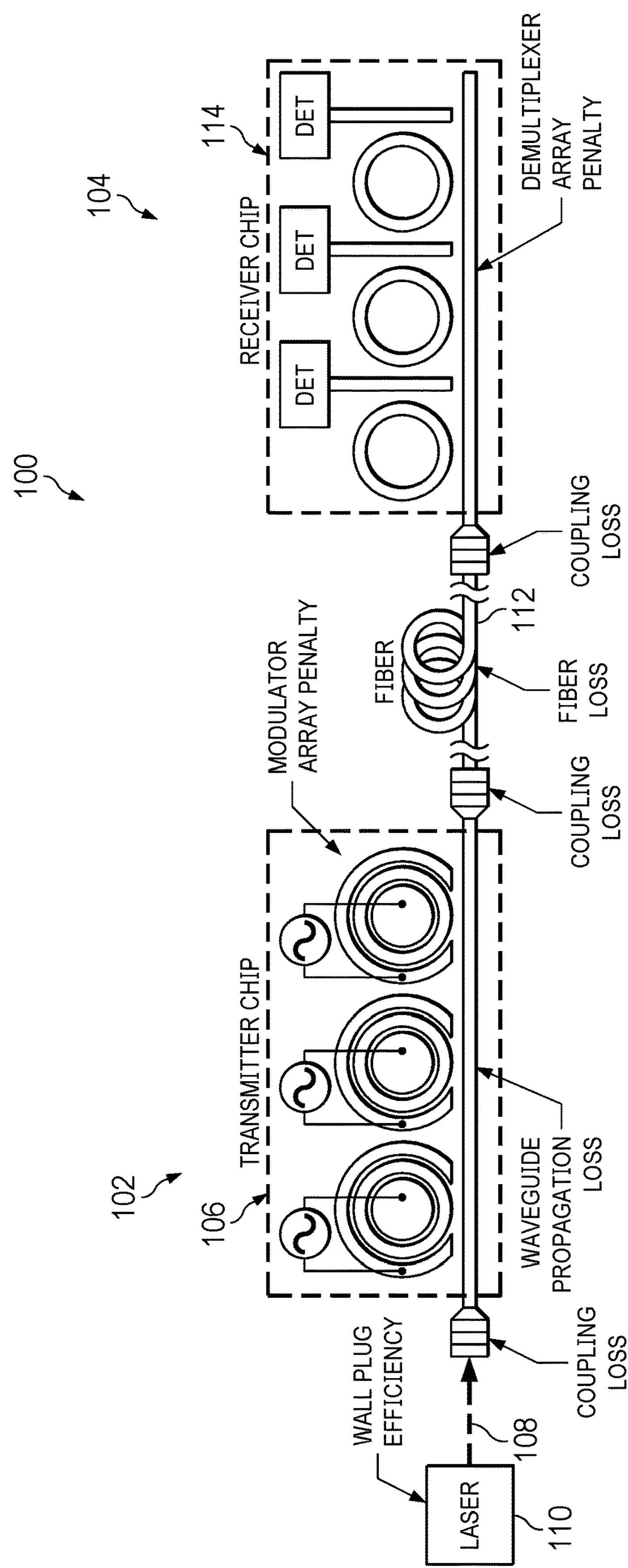
FIG. 1 illustrates an example optical system according to this disclosure.

FIGS. 1 through 5, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As described above, optical communication systems use light to transport data between locations or systems. Optical interconnects for photonic integrated circuits (PICs) transfer light to and from the PICs. The transfer efficiency of an optical interconnect determines the amount of light that is provided to a PIC and any subsequent subsystems using the light, so the transfer efficiency can have a direct impact on the operation and performance of the PIC and subsequent subsystems. Among other things, transfer efficiencies can affect the communication, processing, or sensing performance of applications using PICs. Harsh environments reduce transfer efficiencies, and current interconnects often cannot provide required transfer efficiencies for applications in these harsh environments.

Some advanced optical systems have a number of requirements, such as (i) the use of ultra-high bandwidth processing and communication devices with low size, weight, and power (SWaP); and (ii) the need for high performance in harsh environments like space, defense, hypersonic, cryogenic, or other applications. In many cases, photonic integrated circuits (PICs) are the most viable solution for these systems. To provide high processing and performance, an efficient transfer of light is needed between optical fibers and PICs over challenging thermal, shock, vibration, and radiation profiles encountered in harsh environments (such as military and space platforms).

In various commercial platforms, photonic interconnects have been identified as the most lossy optical components in photonic devices. The photonic interconnects can reduce data rates for communication systems, increase laser power needs, increase overall photonic device costs, and increase power consumption. The photonic interconnects can also experience large optical losses in harsh environments, reducing overall performance and increasing SWaP. For example, environments with 3-10 dB optical loss per interconnect may experience about 0.01% reduction in the maximum data rate. Extreme environments may have even worse optical losses, such as 20 dB optical loss per interconnect. Systems in these extreme environments can experience about ten times this decrease in the maximum data rate and require about ten times the laser power to compensate for power loss, which may increase optical losses due to photonic device nonlinearities at high laser powers and may require higher-sensitivity photodetectors. Systems in these extreme environments can also experience about ten times the power consumption (for same wall-plug efficiency) and a doubling in laser source costs. Interconnect optical losses in harsh environments can result from various factors. These factors may include mismatches in different materials' coefficients of thermal expansion (such as during temperature cycling between −50° C. to +165° C.) and a low tensile modulus of optical adhesives used at the interconnects. These factors may also include materials or geometries that are not selected to provide high mechanical stiffness and degradation due to radiation exposure (such as exposures of 30-100 KRads for a five to ten year device deployment). Conventional interconnects often include low optical insertion losses (such as less than 3 dB) for data centers where they need to satisfy Telcordia standards, which are not applicable to extreme environments. Current photonic interconnects cannot achieve standards for extreme environments, such as expeditionary or military environments.

This disclosure provides various robust photonic connectors (RPCs). In some embodiments, a robust photonic connector efficiently transfers light through multiple paths from a mechanical transfer (MT) connector to a PIC. In various embodiments, the robust photonic connectors include high-density MT connectors, optical fibers that are laser welded to optical mode converters, reflecting freeform notches, optical fiber alignment holders, undercuts for optical fiber fusing to holders, waveguide structures for precise fiber alignment, and optimized grating or edge couplers. In some embodiments, optical fibers are coupled to a PIC having an optical fiber connector and a PIC structure-A mode convertor. Also, in some embodiments, laser fusing is performed to weld optical fibers to optical mode converters and to eliminate their interfaces, which may help to achieve optical insertion losses less than 3 dB.

Various features may be used with the robust photonic connectors. For example, some embodiments use edge couplers and grating couplers to transfer light to a PIC layer from PIC sides. As another example, some embodiments use optical waveguide loops at different PIC layers to precisely align PIC mode couplers with the optical fibers in different planes, such as within a tolerance of ±1 μm. As yet another example, some embodiments use laser fusing to weld optical fibers to an optical fiber alignment holder using millimeter-sized undercuts placed in the optical fiber alignment holder prior to installation. As still another example, some embodiments use coated freeform notches to reflect light to a grating coupler, where the optical incident light matches the grating's optical mode and where the grating's structure is optimized to achieve a low optical insertion loss (such as less than 3 dB).

In some cases, reduced-size interconnects can be used to reduce or minimize mechanical resonances (such as at frequencies between 0 Hz and 50 kHz) and can be fabricated with a material having a large material elastic modulus (such as silicon dioxide or $SiO_2$, which has a Youngs modulus of about 70 GPa). This makes the robust photonic connectors more resistant to linear mechanical shocks, such as shocks of up to 20 kGs or more. In particular embodiments, a single material, such as $SiO_2$, can be used for the optical path between the MT connector and the interconnect(s) at a PIC in order to reduce or avoid coefficient of thermal expansion (CTE) mismatches and to reduce or minimize temperature misalignments on the optical path (such as between −50° C. and 165° C.). Some embodiments use laser fusing to reduce voids in the interface between the mode converter and the optical fibers, which can reduce radiation byproducts from radiation interactions with air in the voids (such as is found in space missions with radiation levels greater than 10 MRad).

Embodiments of this disclosure can provide robust photonic connectors in which laser fusing is used to weld optical fibers to optical mode converters and to eliminate their interfaces so as to achieve low optical insertion losses. In some cases, no epoxies are used in the optical path throughout a connector, and laser fusing can be used to couple components together. This can help to reduce or eliminate damaging radiation effects on optical epoxies. Also, optical coupling diversity is available and provides flexibility in a robust photonic coupler along with less complexity in packaging methods. Further, in some cases, designed PIC features for automated assembly can reduce optical coupling times and reduce optical insertion losses using standard packaging techniques. Moreover, some embodiments provide a reduction of optical insertion losses in relevant mechanical environments by optimizing interconnect shapes and materials. The robust photonic connectors can be thermally and mechanically robust, can support large optical bandwidths, and may be capable of communicating light signals efficiently over multiple bandwidths.

FIG. 1 illustrates an example optical communication system 100 according to this disclosure. As shown in FIG. 1, the system 100 includes nodes 102 and 104 that communicate with one another optically. Each node 102 and 104 represents a component in a ground-, air-, or space-based system that can transmit or receive data using optical communications. In this example, the nodes 102 and 104 can engage in unidirectional communication. However, this is not necessarily required, and the nodes 102 and 104 may engage in bidirectional communication with one another (meaning both nodes 102 and 104 may transmit and receive).

The node 102 in this example includes an optical transmitter 106, which generally operates to produce or transmit optical signals 108 used for communication or other purposes. In some cases, the optical signals 108 may be received from an optical source 110, such as a laser. The optical transmitter 106 may encode information onto the optical signals 108, such as by using suitable amplitude, phase, frequency, or other modulation(s) of light. A fiber-optic medium 112 is coupled between the nodes 102 and 104, such as by an adhesive material like glue, a fastening material, or other coupling mechanism. The optical signals 108 can be transmitted through the fiber-optic medium 112 to the node 104, where an optical receiver 114 receives and processes the optical signals 108. For instance, the optical receiver 114 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). In embodiments in which the nodes 102 and 104 are bidirectional, the same process can be used in the opposite direction, meaning an optical transmitter of the node 104 produces optical signals that are transmitted towards the node 102 and received and processed by an optical receiver of the node 102. In some embodiments, the node 102 receives optical signals 108 from a free-space optical system communication, and the node 102 conveys the optical signals 108 to the node 104 via the fiber-optic medium 112. Note that while optical transmitters and optical receivers are described here as separate components, they can be integrated into optical transceivers. This may allow, for example, the same structure to be used for both transmission and reception purposes.

Optical communications in a system can ordinarily experience a number of losses as optical signals propagate through the system, such as losses resulting from differing materials in the system. For example, coupling losses may occur at various interfaces between components in the system. As described in more detail below; the optical communication system 100 can include a number of features that can help to reduce or minimize losses in the optical communication system 100. Among other things, these features relate to common materials being used in components of the optical communication system 100 and laser fusion being used to couple components of the optical communication system 100. In some cases, these features can help to reduce or minimize problems experienced by optical connectors in harsh environments.

The optical transmitters, receivers, and transceivers described in this disclosure may find use in a large number of applications, such as communications, imaging, and remote sensing applications. For example, optical transmitters, receivers, or transceivers may be used in machinery, aircraft, land or water-based vehicles, or telecommunication systems to transport information rapidly between locations. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing. In general, this disclosure is not limited to any particular application of the optical transmitters, receivers, and transceivers.

Although FIG. 1 illustrates one example of an optical communication system 100, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2A:
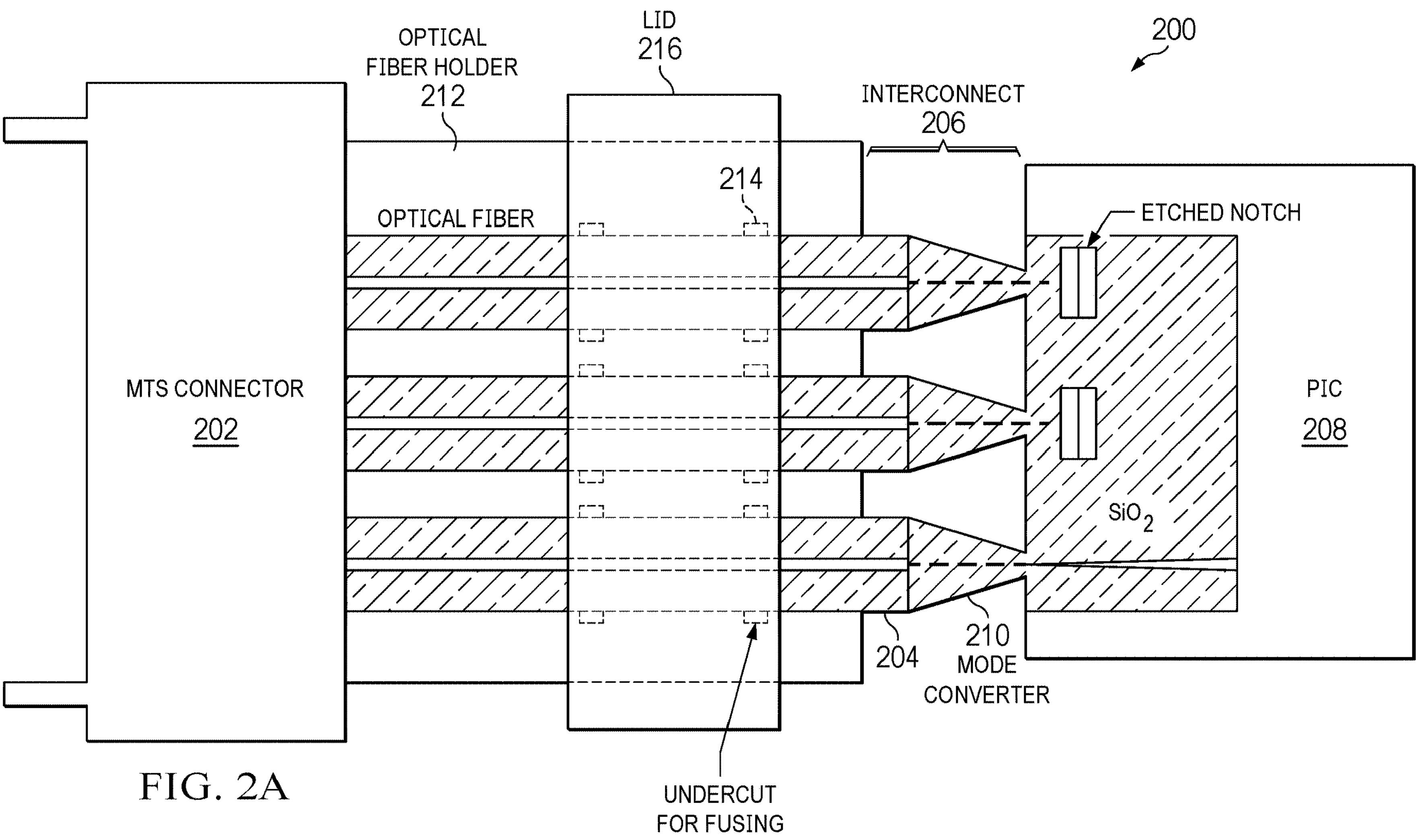
FIGS. 2A and 2B illustrate an example robust photonic connector and related details according to this disclosure.
Figure 2B:
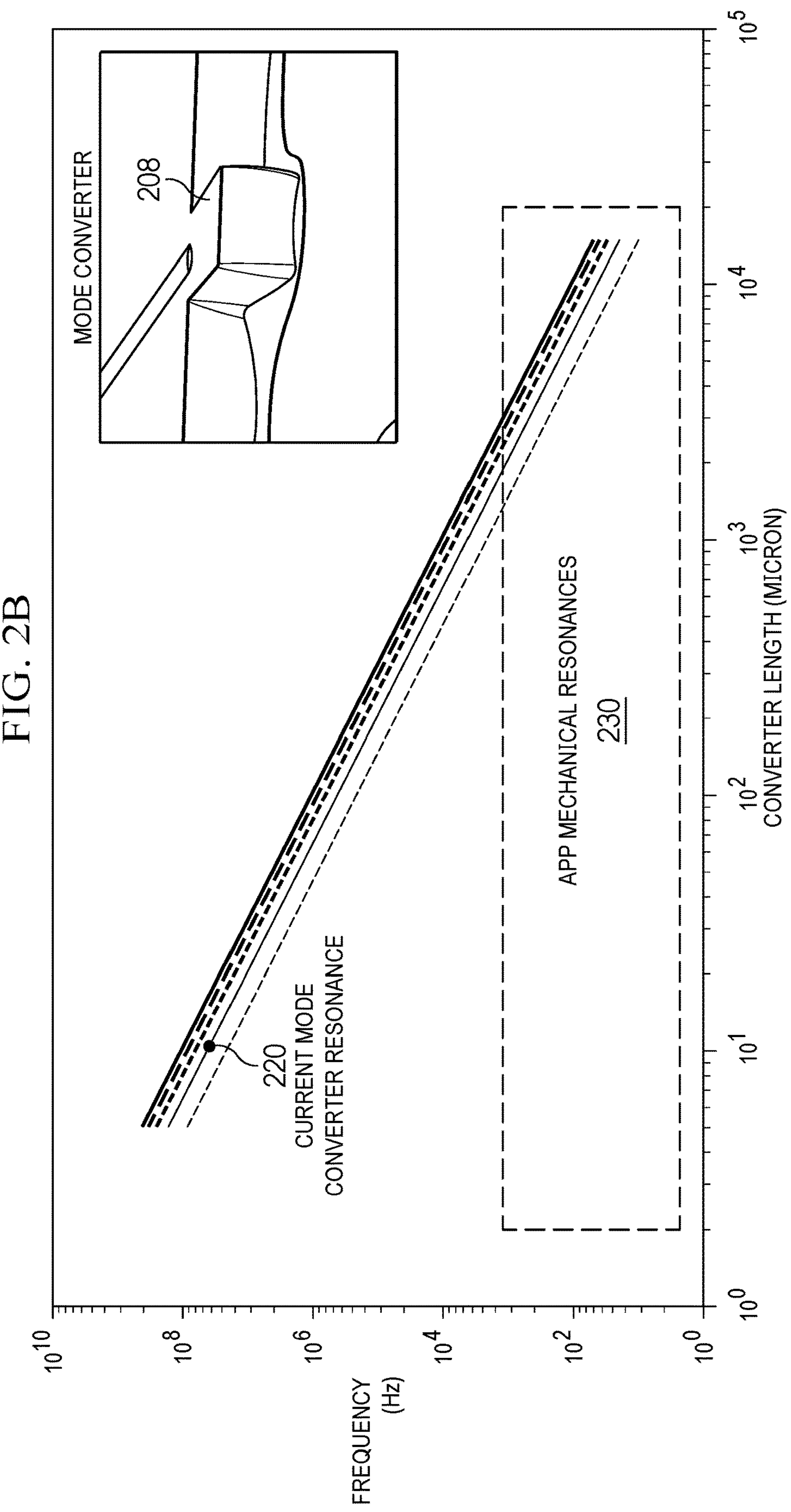

FIGS. 2A and 2B illustrate an example robust photonic connector 200 and related details according to this disclosure. The robust photonic connector 200 may, for example, represent or be used with or included in the optical nodes 102 and 104 of the system 100 of FIG. 1, such as when the robust photonic connector 200 couples the fiber-optic medium 112 to the nodes 102 and 104. However, the robust photonic connector 200 may be used in any other suitable device(s) and in any other suitable system(s).

The robust photonic connector 200 efficiently transfers light through multiple paths from a mechanical transfer system (MTS) connector 202 to a PIC 208. As shown in FIG. 2A, the robust photonic connector 200 includes the MTS connector 202 and one or more optical fibers 204. The PIC 208 includes an interconnect 206, such as an optical fiber connector, and one or more optical mode converters 210. The MTS connector 202 is configured to couple to another optical system, such as an optical source 110 or another MTS connector. In some cases, the MTS connector 202 can be a high-density MT connector.

The optical fibers 204 are welded to the optical mode converters 210 and are secured by an optical fiber alignment holder 212. In some embodiments, the optical fibers 204 can be formed of fused silica, such as amorphous silicon dioxide ($SiO_2$). Each of the optical mode converters 210 is a device configured to provide a transition between an optical fiber 204 and the PIC 208. The optical mode converters 210 can includes waveguides, reflectors, and couplings to perform the transition. The optical fibers 204 are welded to the interconnect 206 by a fusing welding process, such as a laser fusing or arc welding. In certain embodiments, laser fusing is used to weld the optical fibers 204 to the optical mode converters 210 and to eliminate a multi-material interface, which can help to achieve a low optical insertion loss. The laser fusing also reduces voids in the interface between the optical mode converters 210 and the optical fibers 204, which reduces radiation byproducts from radiation interactions with air in the voids. In certain embodiments, the optical fibers are welded together via an arc welding method or process.

In some embodiments, the optical fiber alignment holder 212 includes undercuts 214, such as millimeter-sized or other vias (openings), cut into or otherwise formed in the optical fiber alignment holder 212 prior to installation in the robust photonic connector 200 or prior to coupling the optical fibers 204. The optical fibers 204 can be welded, such as by laser fusing, to the optical fiber alignment holder 212 using the undercuts 214 made in the optical fiber alignment holder 212. Also, in some embodiments, the optical fiber alignment holder 212 includes one or more "V-grooves" that respectively accommodate one or more optical fibers 204. Each of the V-grooves is configured to provide a channel to maintain a position or alignment of an optical fiber 204. In addition, in some embodiments, the optical fiber alignment holder 212 includes a lid 216 for further securing the optical fibers 204 within the V-grooves of the optical fiber alignment holder 212.

In particular embodiments, the optical mode converters 210 include one or more reflecting freeform notches, one or more waveguide structures for precise fiber alignment, and/or one or more optimized grating and edge couplers. In some cases, edge couplers and grating couplers can be used to transfer light to a PIC layer from a side of the PIC 208. In some embodiments, optical waveguide loops are disposed at different PIC layers to precisely align PIC mode couplers with optical fibers in different planes, such as to within a ±1 μm tolerance. Also, in some embodiments, the PIC 208 includes coated freeform notches that reflect light to an optimized grating coupler in which the optical incident light matches the grating's optical mode and in which the grating's structure is optimized to achieve low optical insertion loss. Further, in some embodiments, the interconnect 206 includes one or more reduced-size interconnects that reduce or minimize mechanical resonances at certain frequencies (such as between 0 Hz and 50 kHz) and are fabricated with a material having a large material elastic modulus (such as $SiO_2$). For example, as shown in FIG. 2B, a resonance 220 of the optical mode converter 210 is outside a mechanical resonance 230 of a system in which the robust photonic connector 200 is employed.

Among other things, the laser fusing, reflecting freeform notches, waveguide structures, grating and edge couplers, and other features enable the use of only one material between the MTS connector 202 and the PIC 208. Using one material (such as $SiO_2$) for the optical path between the MTS connector 202 and the interconnect 206 of the PIC 208 can help to avoid CTE mismatches and reduce or minimize temperature misalignments in the optical path. The robust photonic connector 200 includes an interconnect 206 with an ultra-low optical insertion loss that can be used in harsh environments of relevant operational platforms. Depending on the implementation, the design of the robust photonic connector 200 may enable a significant reduction in CTE mismatches, a significant increase in heat transfer rates, increased thermal robustness against thermal cycling and shock, and improved tensile modulus. The design of the robust photonic connector 200 may also help to avoid degradation due to radiation exposure by eliminating use of optical adhesives (since radiation destroys acrylic-based epoxy links) and laser fusing to reduce voids in interfaces between mode converters and optical fibers. The design of the robust photonic connector 200 may further increase robustness and stiffness of the interconnects by using interconnect materials having a high mechanical elastic modulus and by employing geometries that avoid natural vibration resonances.

Although FIGS. 2A and 2B illustrate one example of a robust photonic connector 200 and related details, various changes may be made to FIGS. 2A and 2B. For example, the robust photonic connector 200 may include any suitable number of optical devices or different types of optical devices. Also, the specific alignments above are for illustration only. In addition, any other suitable components may be used with the robust photonic connector 200 to support any other desired functions of the robust photonic connector 200.

Figure 3A:
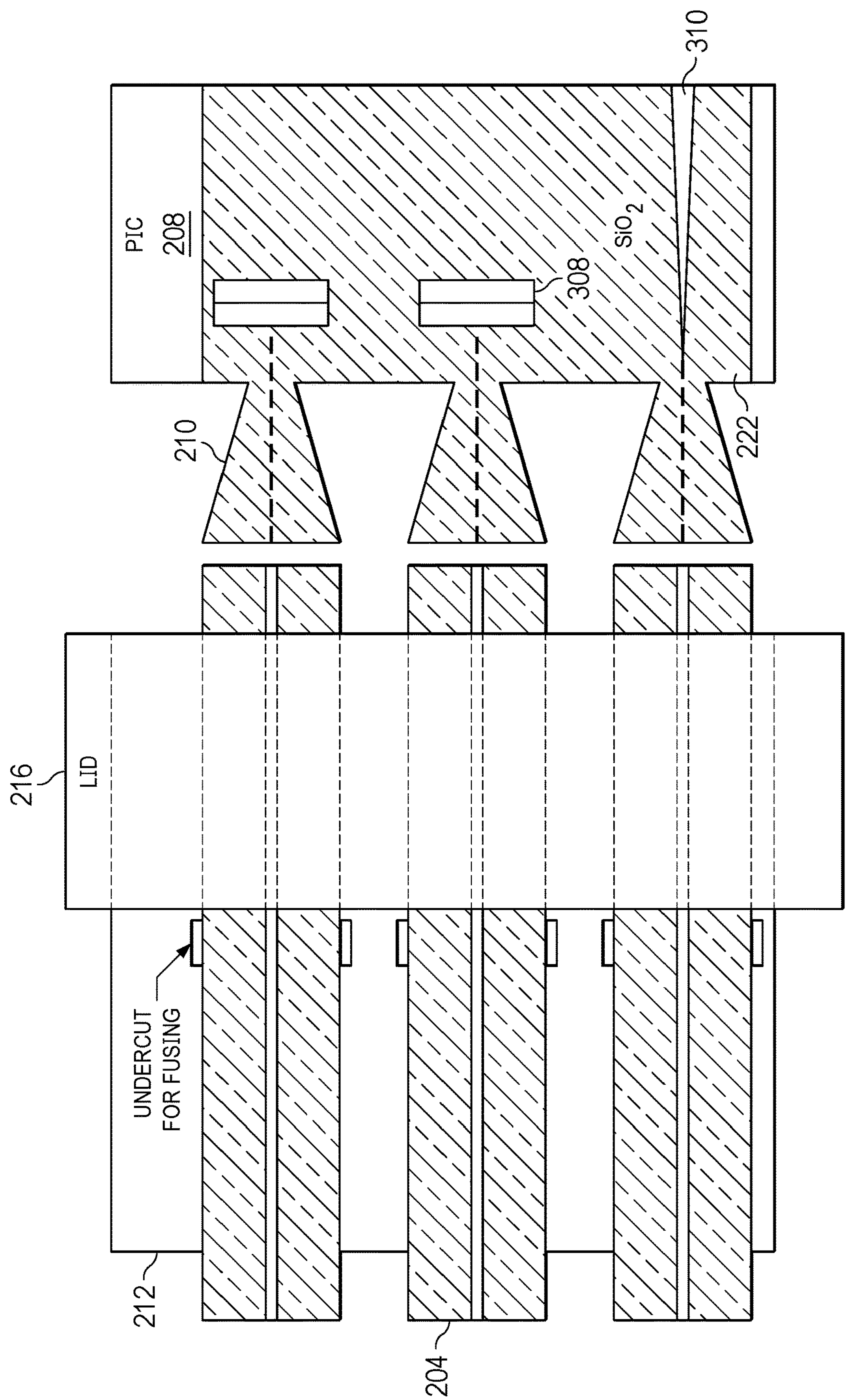
FIGS. 3A through 3C illustrate top and side views of example robust photonic connectors and related details according to this disclosure.
Figure 3B:
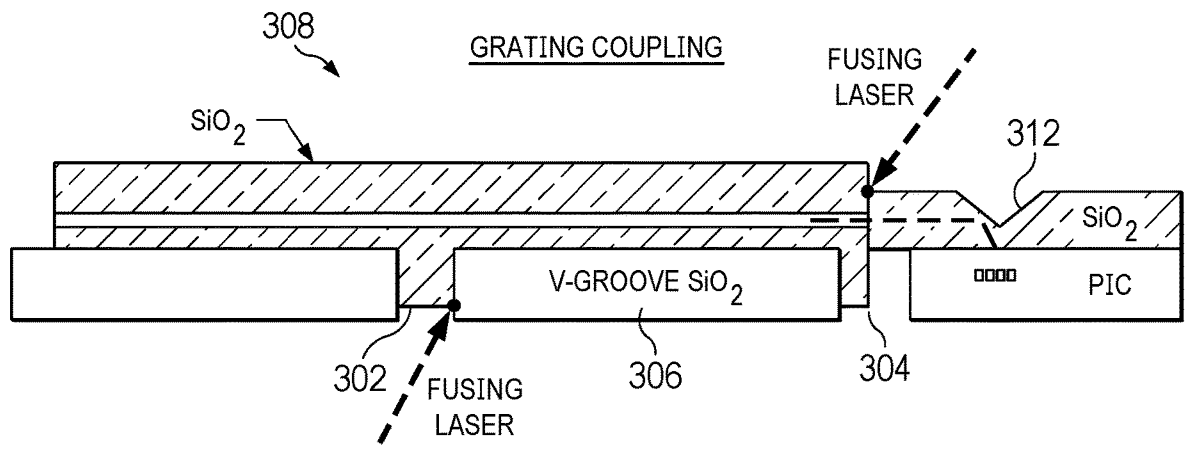
Figure 3C:
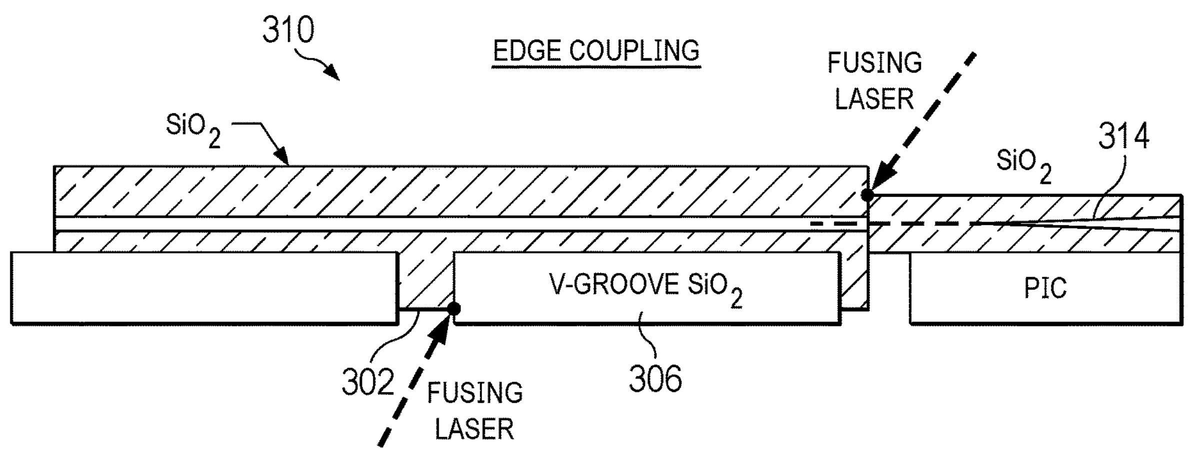

FIGS. 3A through 3C illustrate top and side views of example robust photonic connectors 200 and related details according to this disclosure. The robust photonic connector 200 may, for example, represent or be used with or included in the optical nodes 102 and 104 of the system 100 of FIG. 1, such as when the robust photonic connector 200 couples the fiber-optic medium 112 to the nodes 102 and 104. However, the robust photonic connector 200 may be used in any other suitable device(s) and in any other suitable system(s).

In some embodiments, the robust photonic connector 200 can be configured to accommodate multiple coupling types of connectors. For example, the robust photonic connector 200 can utilize one-dimensional connectors supporting a planar design. Accordingly, the robust photonic connector 200 can be configured to universally connect to multiple types of optical systems.

As shown in the example of FIG. 3A, the optical fibers 204 are secured in alignment by the optical fiber alignment holder 212. The optical fibers 204 are aligned to couple to the optical mode converters 210 and the optical fiber connectors 222 interfacing to the PIC 208. In the examples shown in FIGS. 3B and 3C, the optical fiber alignment holder 212 includes a plurality of undercuts 302 that enable a laser fusing of the optical fibers 204 to the optical fiber alignment holder 212 and an edge undercut 304 that enables a laser fusing of the 20) optical fibers 204 to the optical mode converters 210. The optical fiber alignment holder 212 further includes a V-groove 306 and a coupling lid 216 to hold the optical fibers 204. Accordingly, the optical fiber alignment holder 212 is an epoxy-less device configured to secure and maintain the alignment of the optical fibers 204 to the optical mode converters 210.

The optical mode converters 210 and the optical fiber connector 222 can be formed from a common material (such as silicon dioxide). In some embodiments, the optical fiber connector 222 includes a grating coupling 308. The grating coupling 308 includes reflecting freeform notches 312. The reflecting freeform notches 312 can be coated freeform notches that reflect light to a grating coupler in which the optical incident light matches the grating's optical mode and in which the grating's structure is optimized to achieve low optical insertion loss. Also, in some embodiments, the optical fiber connector 222 includes an edge coupling 310. The edge coupling 310 can include a waveguide structures 314, such as waveguide loops at different PIC layers to precisely align the optical mode converters 210 with optical fibers 204 in different planes.

Although FIGS. 3A through 3C illustrate top and side views of example robust photonic connectors 200 and related details, various changes may be made to FIGS. 3A through 3C. For example, various components in FIGS. 3A through 3C may have any suitable size, shape, and dimensions and be formed from any suitable materials.

Figure 4A:
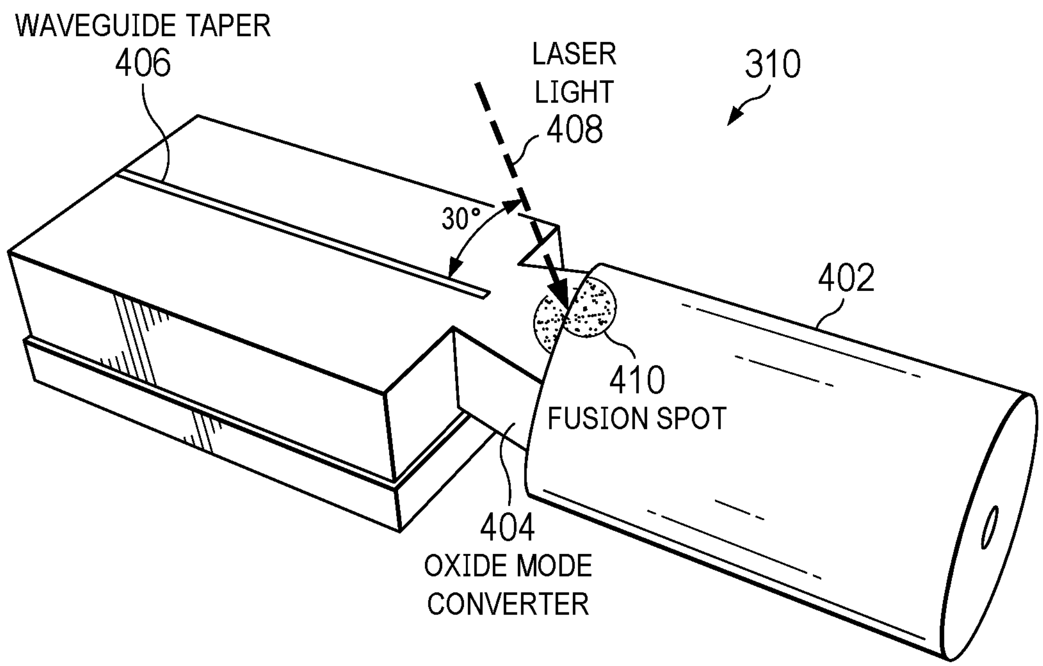
FIGS. 4A and 4B illustrate oblique and side views of an example laser fusing operation according to this disclosure.
Figure 4B:
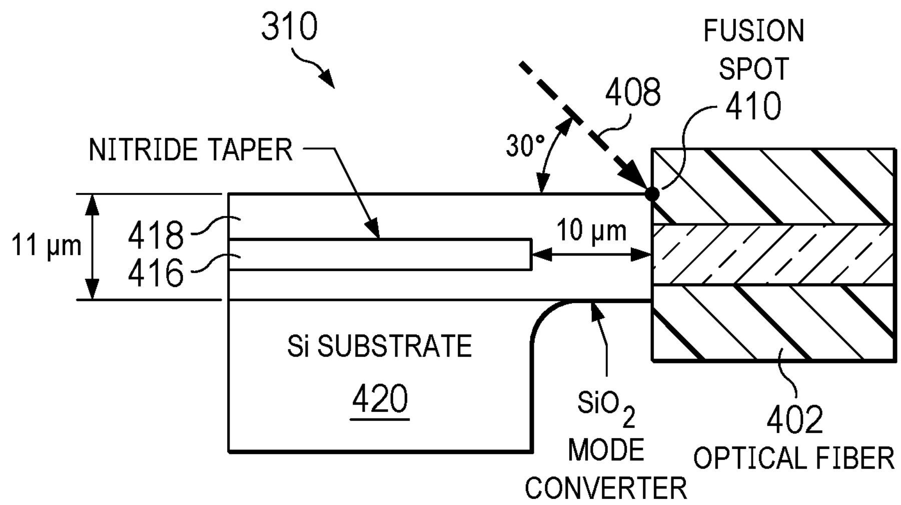

FIGS. 4A and 4B illustrate oblique and side views of an example laser fusing operation according to this disclosure. The laser fusing operation can be used in various embodiments as described above to attach components of the robust photonic connector 200. As shown in FIGS. 4A and 4B, the robust photonic connector 200 includes an edge coupling 310 having an optical fiber 402 that is coupled to an oxide mode converter 404, such as $SiO_x$, which is further connected to a waveguide taper 406. The optical fiber 402 can be the same as or similar to one of the optical fibers 204, and the oxide mode converter 404 can be the same as or similar to one of the optical mode converters 210. For example, the optical fiber 402 can be an $SiO_2$ optical fiber. The waveguide taper 406 can be the same as or similar to one of the waveguide structures 314. In some embodiments, the waveguide taper 406 is a nitride taper 416 etched in an $SiO_2$ optical layer 418 on a silicon substrate 420.

The optical fiber 402 is laser-fuse welded to the oxide mode converter 404 by applying a laser light 408 at a fusion spot 410. In the illustrated example, the laser light 408 is applied at a 30° angle of incidence, although any other suitable angles could be used. As shown in FIG. 4B, the mode converter can be an $SiO_2$ mode converter having a 10 μm length and an 11 μm diameter, although any other suitable dimensions could be used. The optical fiber 402 is aligned with the oxide mode converter 404 so that light signals propagating through the optical fiber 402 further efficiently propagate through the oxide mode converter 404 and the waveguide taper 406.

Although FIGS. 4A and 4B illustrate oblique and side views of an example laser fusing operation, various changes may be made to FIGS. 4A and 4B. For example, any other suitable laser fusing operation may be used here.

Figure 5:
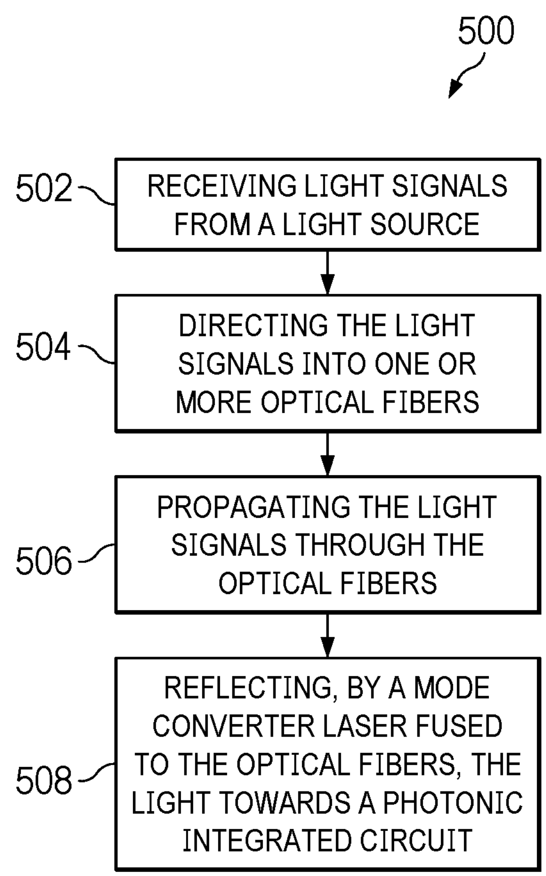
FIG. 5 illustrates an example method for communicating an optical signal according to this disclosure.

FIG. 5 illustrates an example method 500 for communicating an optical signal according to this disclosure. For ease of explanation, the method 500 is described with respect to the robust photonic connector 200, which may be used in the optical nodes 102, 104 in the system 100 of FIG. 1. However, the method 500 could be used with any other suitable optical device(s) or any other suitable device(s) and in any other suitable system(s).

In step 502, a light beam is received from a light source. For example, the light source can be an external source coupled to the robust photonic connector 200 via the MTS connector 202. In step 504, the light beam is directed onto one or more of the optical fibers 204. Each of the optical fibers is coupled on a first end to the MTS connector 202 and secured from vibrational movement by an optical fiber alignment holder 212. The light beam propagates through the optical fibers at step 506. The light is transferred from the optical fibers to at least one optical mode converter 210, which directs or reflects the light towards the PIC 208 at step 508. The second end of the optical fibers are fusion welded to the optical mode converter(s) 210, such as by laser fusing or arc welding. In some embodiments, the optical fibers 204 and optical mode converter 210 are formed from the same material, such as $SiO_2$.

Although FIG. 5 illustrates one example of a method 500 for communicating an optical signal, various changes may be made to FIG. 5. For example, the light source can be generated by the PIC 208 and propagate from the PIC 208 through the optical mode converter 210 onto the optical fibers 204 and through the MTS connector 202. Also, while shown as a series of steps, various steps in FIG. 5 could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

an optical fiber; and a mode converter having a resonance outside of a mechanical resonance of an optical communication system coupled or to be coupled to the mode converter;

wherein the optical fiber and the mode converter are welded together by fusion welding a first end of the optical fiber to the mode converter.

2. The apparatus of claim 1, further comprising:

an optical fiber holder configured to maintain an alignment of the optical fiber with respect to the mode converter.

3. The apparatus of claim 2, wherein the optical fiber holder comprises:

a V-groove configured to accommodate the optical fiber; and a lid configured to secure the optical fiber on the optical fiber holder.

4. The apparatus of claim 2, wherein:

the optical fiber holder comprises a plurality of vias; and the optical fiber is welded to the optical fiber holder at each of the plurality of vias.

5. The apparatus of claim 1, wherein the mode converter is coupled to a photonic integrated circuit via one of a grating coupling or an edge coupling.

6. The apparatus of claim 5, wherein the mode converter comprises one of:

a reflecting freeform notch configured to reflect light towards the grating coupling; or a waveguide loop configured to align a mode coupler of the mode converter with the optical fiber.

7. The apparatus of claim 1, wherein the optical fiber and the mode converter comprise silicon dioxide.

8. The apparatus of claim 1, wherein the optical fiber is coupled on a second end to a mechanical transfer (MT) connector.

9. A system comprising:

an optical communication device configured to transmit or receive optical signals, wherein the optical communication device comprises:

an optical fiber; and a mode converter having a resonance outside of a mechanical resonance of the system;

wherein the optical fiber and the mode converter are welded together by fusion welding a first end of the optical fiber to the mode converter.

10. The system of claim 9, wherein the optical communication device further comprises an optical fiber holder configured to maintain an alignment of the optical fiber with respect to the mode converter.

11. The system of claim 10, wherein the optical fiber holder comprises:

a V-groove configured to accommodate the optical fiber; and a lid configured to secure the optical fiber on the optical fiber holder.

12. The system of claim 10, wherein:

the optical fiber holder comprises a plurality of vias; and the optical fiber is welded to the optical fiber holder at each of the plurality of vias.

13. The system of claim 9, wherein the mode converter is coupled to a photonic integrated circuit via one of a grating coupling or an edge coupling.

14. The system of claim 13, wherein the mode converter comprises one of:

a reflecting freeform notch configured to reflect light towards the grating coupling; or a waveguide loop configured to align a mode coupler of the mode converter with the optical fiber.

15. A method comprising:

propagating light through an optical fiber; and using a mode converter to direct the light towards a photonic integrated circuit (PIC), the mode converter having a resonance outside of a mechanical resonance of an optical communication system coupled to the mode converter;

wherein the optical fiber and the mode converter are welded together by fusion welding a first end of the optical fiber to the mode converter.

16. The method of claim 15, wherein an alignment of the optical fiber and the mode converter is maintained by an optical fiber holder.

17. The method of claim 16, wherein the optical fiber holder comprises:

a V-groove configured to accommodate the optical fiber; and a lid configured to secure the optical fiber on the optical fiber holder.

18. The method of claim 16, wherein:

the optical fiber holder comprises a plurality of vias; and the optical fiber is welded to the optical fiber holder at each of the plurality of vias.

19. The method of claim 15, wherein the mode converter is configured to direct the light towards the PIC by one of:

using a reflecting freeform notch to reflect the light towards the PIC; or using a waveguide loop to align a mode coupler of the mode converter with the optical fiber.

20. The apparatus of claim 1, wherein:

the fusion welding comprises one of: a laser fusing or arc welding, and fusion welding the first end of the optical fiber to the mode converter comprises laser fusing the first end of the optical fiber to the mode converter or arc welding the first end of the optical fiber to the mode converter.

* * * * *